(12) United States Patent
Keats et al.

(10) Patent No.: US 6,219,729 B1
(45) Date of Patent: Apr. 17, 2001

(54) APPARATUS AND METHOD FOR PROVIDING FOR EFFICIENT COMMUNICATION BETWEEN HIGH AND LOW-LEVEL PROCESSING ENGINE OF A DISK DRIVE FORMATTER

(75) Inventors: Dennis Keats, Riverside; Kang Xiao, Irvine, both of CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/052,126

(22) Filed: Mar. 31, 1998

(51) Int. Cl.[7] ............................ G11B 27/10; G11B 20/12; G06F 13/14

(52) U.S. Cl. .................... 710/58; 710/5; 710/35; 710/60; 360/51

(58) Field of Search .................... 710/35, 5, 58, 710/60; 711/4.111, 154; 360/77.8, 51

(56) References Cited

U.S. PATENT DOCUMENTS

| | | | |
|---|---|---|---|
| 4,527,233 | * 7/1985 | Ambrosius, III et al. | 711/167 |
| 4,773,004 | * 9/1988 | Gershenson et al. | 711/113 |
| 5,625,840 | * 4/1997 | Numata et al. | 710/5 |
| 6,000,018 | * 12/1999 | Packer et al. | 711/154 |

FOREIGN PATENT DOCUMENTS

98/14939 * 4/1998 (WO) .

* cited by examiner

Primary Examiner—Thomas Lee
Assistant Examiner—Ilwoo Park
(74) Attorney, Agent, or Firm—W. Daniel Swayze, Jr.; Wade James Brady, III; Frederick J. Telecky, Jr.

(57) ABSTRACT

An apparatus is employed for providing for efficient communication between high level and low level processing engines in a disk formatter for formatting a disk, the high-level engine outputting at least one instruction to control disk operations to the low-level engine which processes the instruction. The apparatus includes an instruction queue within the low-level engine. The instruction queue stores the instruction received by the low level processing engine from the high level processing engine, which outputs the instruction to the memory in accordance with a first clock signal generated by the high-level engine. The instruction queue outputs the instruction in accordance with a second clock signal of the low level processing engine which corresponds to a predetermined disk transfer rate. In accordance with another embodiment of the present invention, a method is also employed for providing for efficient communication between high and low level processing engines in a disk formatter for formatting a disk. The method includes the steps of storing an instruction for controlling disk operations output by the high level processing engine in an instruction queue of the low-level engine. The instruction is output by the high level processing engine in accordance with a first clock signal of the high level processing engine. In addition, the instruction is output from the instruction queue in accordance with a second clock signal of the low level processing engine which corresponds to a predetermined disk transfer rate.

20 Claims, 6 Drawing Sheets

APPARATUS AND METHOD FOR PROVIDING FOR EFFICIENT COMMUNICATION BETWEEN HIGH AND LOW-LEVEL PROCESSING ENGINE OF A DISK DRIVE FORMATTER

BACKGROUND OF THE INVENTION

1. Field of the Invention

The present invention relates to the operation of a disk formatter implemented in a disk drive controller. More particularly, the present invention relates to an apparatus and method for providing for efficient communication between high and low level processing engines in a disk drive formatter having a highly flexible architecture capable of handling different formatting schemes.

2. Description of Related Art

Conventional disk drives employ disk formatters having a fixed architecture capable of handling a single formatting scheme. By way of example, the formatting scheme may rely upon the use of a header associated with each sector of user data residing on the tracks of a magnetic disk to uniquely identify the sector. However, using headers takes up space on the magnetic disk which could otherwise be employed for storing user data. Accordingly, a number of alternate formatting schemes that do not rely upon headers have been implemented in commercial disk drives. Yet, the disk formatters that use these alternative formatting schemes, rather than being designed to accommodate a number of different formatting schemes, are instead "hard-wired" for a single formatting scheme, which reduces the flexibility of the disk formatter.

Accordingly, even where a disk formatter might uses a writeable control store (WCS) to provide some programming capability that implements a particular formatting scheme, the writeable control store often relies on such a small amount of memory and is so primitive that a system processor (e.g., digital signal processor (DSP) or microcontroller) must be employed to constantly update the writeable control store with commands and monitor the status of the writeable control store. In addition, when a writeable control store is used for disk formatting, the DSP must dedicate resources which could otherwise be employed for non-formatting related tasks.

One disadvantage inherent in conventional prior art disk formatters is that they cannot be readily adapted to contend with rapid changes in disk drive technology which are geared towards increasing the number of tracks or bits per inch stored on the magnetic disk. Moreover, the proliferation of vendor specific diagnostic tools used in disk formatters requires greater flexibility on the part of those disk formatters to accommodate different diagnostic techniques.

In order to contend with different disk formatting schemes, a flexible disk formatter architecture has been developed which is the subject of a U.S. patent application entitled, "Programmable High Performance Disk Formatter for Headerless Disk Controller," which is being filed on Mar. 31, 1998, contemporaneously with the present application by Keats et al., and assigned to the same assignee.

The inventive disk formatter described in the above-mentioned application requires the use of two processing engines to facilitate disk operations. One of the two processing engines, referred to below as a high level processing engine, executes user-defined code based on a set of instructions created for a disk formatter application. The use of a high level processing engine reduces the processing power required by the DSP to implement a particular formatting scheme.

These sequencing instructions are executed by the other processing engine, referred to below as a low level processing engine, to directly control disk operation. By way of example, the low level processing engine may execute sequencing instructions which control the reading and writing of data to a disk, as well as the formatting of a disk.

One of the problems which arises with the use of two separate processing engines is that they must coordinate the flow of data between themselves. This relationship is further complicated when the engines operate using different clocks, which is the case with the inventive disk formatter disclosed in the above-mentioned application. In particular, the high level processing engine operates using a much faster clock which is geared towards processing millions of instructions per second (MIPS), while the low level processing engine operates on a slower clock which is a function of the disk transfer rate of the associated disk drive.

One possible approach for coordinating the flow of data between the high and low processing engines would be to rely on conventional hand-shaking techniques to synchronize their activities. However, such an approach could be rather complex to implement and might have to account for the fact that the low level processing engine, which must keep pace with a rotating disk, cannot sacrifice the time required to send status reports back to the high level processing engine. Accordingly, in light of the foregoing, a simple communication scheme is called for that accounts for the different clocks within the high and low level processing engines and for the fact that the low-level processing engine must keep pace with a rotating disk.

SUMMARY OF THE INVENTION

The principal advantage of the present invention is the provision of an apparatus and method which substantially obviates one or more of the limitations and disadvantages of the conventional hand-shaking techniques mentioned above.

In view of the foregoing, it is an object of the present invention to provide an apparatus for providing for efficient communication between high level and low level processing engines in a disk formatter for formatting a data storage disk. The high level processing engine outputs at least one instruction for controlling disk operations to the low level processing engine which processes the instruction.

Additional features and advantages of the invention are set forth in the following description, and, in part, will be apparent from the description, or may be learned by practice of the invention. The objectives and other advantages of the invention will be realized and attained by the apparatus and method particularly pointed out in the written description and claims hereof as well as the appended drawings.

To carry out the above and other objects of the invention, the apparatus is provided with an instruction queue included within the low level processing engine. The instruction queue stores the instruction received by the low level processing engine from the high level processing engine. The high level processing engine outputs the instruction to the instruction queue in accordance with a first clock signal generated by the high level processing engine. The instruction queue outputs the instruction in accordance with a second clock signal of the low level processing engine which corresponds to a predetermined disk transfer rate. The first and second clock signals may have different frequencies.

According to one embodiment of the inventive apparatus, the instruction queue stores a burst of instructions received by the low level processing engine from the high level processing engine. In addition, the burst of instructions corresponds to a predetermined sector of the disk.

The disk may be formatted in accordance with sector layout information. In particular, the disk may be formatted in accordance with sector layout information defined by a geometry per wedge (GPW) based formatting scheme and one of the predetermined sector and a fragment of the predetermined sector is included within a data wedge of the disk.

According to one aspect of the inventive apparatus, the burst of instructions is output by the high level processing engine at least one sector before the predetermined sector to which the instructions correspond is subjected to a disk operation.

According to another aspect of the present invention, the predetermined sector of the disk may include two separate fragments, each included within a separate data wedge of the disk. In addition, the burst of instructions corresponding to the two separate fragments of the predetermined sector is output at least one sector before a first fragment of the predetermined sector is subjected to a disk operation.

According to yet another aspect of the inventive apparatus, for each sector included in the data wedge corresponding to any one of the predetermined sector and sectors of data preceding the predetermined sector of data, a sector pulse is generated by the high level processing engine. In addition, the burst of instructions is output by the high level processing engine upon generation of the sector pulse which corresponds to one of the sectors which precedes the predetermined sector.

According to yet another aspect of the inventive apparatus, the sector pulse corresponding to the predetermined sector of data is generated by the high level processing engine based upon a sector timing compare value which reflects the relative position of a sector within a data wedge.

According to yet another aspect of the present invention, the instruction queue outputs the instruction to a decoder included within the low level processing engine. The decoder receives and processes the instruction in accordance with the second clock signal when the high level processing engine executes a start instruction.

According to another embodiment of the present invention, a method is employed for providing for efficient communication between high and low level processing engines in a disk formatter for formatting a disk which stores data. The method includes the step of storing an instruction for controlling disk operations output by the high level processing engine in an instruction queue of the low level processing engine. The instruction is output by the high level processing engine in accordance with a first clock signal generated by the high level processing engine. The inventive method also includes the step of outputting the instruction from the instruction queue in accordance with a second clock signal of the low level processing engine which corresponds to a predetermined disk transfer rate. The first and second clock signals may have different frequencies.

According to one aspect of the present invention, the step of storing comprises the step of storing a burst of instructions output by the high level processing engine, the burst of instructions corresponding to a predetermined sector stored on the disk.

The method may also include the steps of formatting the disk in accordance with sector layout information. In particular, the disk may be formatted in accordance with sector layout information defined by a geometry per wedge (GPW) based formatting scheme and including one of the predetermined sector and a fragment of the predetermined sector within a data wedge of the disk.

The inventive method may further include the step of outputting the burst of instructions from the high level processing engine at least one sector before the predetermined sector to which the burst of instructions corresponds is subjected to a disk operation.

According to one aspect of the inventive method, the predetermined sector stored on the disk may comprise two separate fragments. In addition, the step of including comprises the step of including each of the two fragments within a separate data wedge of the disk. Advantageously, the burst of instructions may correspond to the two separate fragments of the predetermined sector. In addition, the step of outputting the burst of instructions occurs at least one sector before a first fragment of the predetermined sector is subjected to a disk operation.

The inventive method may also further include the step of generating a sector pulse from the high level processing engine for each sector of data within the data wedge which corresponds to any one of the predetermined sector and sectors preceding the predetermined sector. In addition, the step of outputting the burst of instructions occurs upon generation of the sector pulse which corresponds to one of the sectors which precedes the predetermined sector.

The inventive method may also further include the steps of determining the data wedge in which at least a fragment of the predetermined sector is included and performing the step of generating the sector pulse corresponding to the predetermined sector based upon a sector timing compare value which reflects the relative position of a sector within a data wedge.

The inventive method may also further include the step of decoding the instruction output by the instruction queue in accordance with the second clock signal when the high level processing engine executes a start instruction.

It is to be understood that both the foregoing general description and the following detailed description are exemplary and explanatory and are intended to provide further explanation of the invention as claimed.

BRIEF DESCRIPTION OF THE DRAWINGS

These and other features, aspects and advantages of the present invention will become better understood with reference to the following description, appended claims, and accompanying drawings, in which:

DETAILED DESCRIPTION OF THE PREFERRED EMBODIMENTS

The present invention is directed to an apparatus and method for providing for efficient communication between high and low level processing engines of a disk formatter. Although the disk formatter is described in conjunction with magnetic disks, the same inventive concepts are applicable to all disc-shaped information storage media, for example, optical storage discs such as compact discs and more particularly, digital versatile discs (DVDs).

Figure 1:
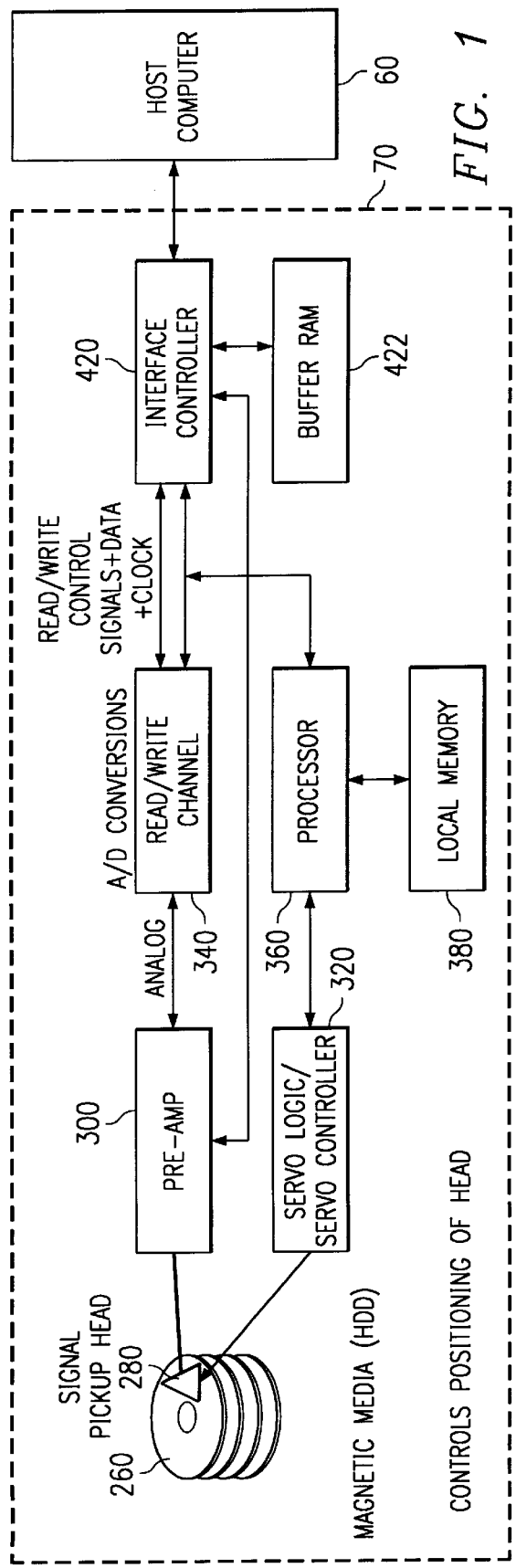
FIG. 1 shows a host computer and a hard disk drive system.

FIG. 1 depicts a host computer 60 which interacts with a hard disk drive system 70 of a type in which the present invention may be employed. The hard disk drive system 70 includes a plurality of magnetic disks 260 arranged along an axis which extends perpendicularly to the face of each disk.

The hard disk drive system 70 also includes at least one signal pick-up head 280 which is provided over the surface of one of the magnetic disks 260. Although there is a signal pick-up head 280 for each of the magnetic disks, in order to simplify FIG. 1 multiple signal pickup heads are not shown. The signal pick-up head 280 reads data stored on the disk and outputs the data to a pre-amp 300 which amplifies the signal. The signal pick-up head 280 is controlled by the servo logic of a servo controller 320 which positions the signal pick-up head 280 accurately over a predetermined track of one of the magnetic disks 260.

The pre-amp 300 outputs an analog signal to a read/write channel 340 which extracts digital data (e.g., NRZ data) together with a clock signal from the analog signal. Thereafter, the digital data and clock are output from the read/write channel 340 to the interface controller 420 where sectors are formed. A digital signal processor 360 (DSP or microcontroller) controls the overall disk drive operation including implementing servo control algorithms to seek, track, and control spindle speed. The DSP 360 also programs the read/write channel 340 and the interface controller 420. The DSP 360 has a corresponding local memory device 380 that includes static random access memory (SRAM), which is used as a scratch pad, and an erasable programmable memory (EPROM), which stores fixed content tables and programs.

The digital data and clock extracted by the read/write channel 340 are also output to an interface controller 420 which controls the flow of data from the magnetic disk read by the signal pick-up head 280. The interface controller 420 is connected to a memory buffer 422 which temporarily stores the extracted digital data in order to account for the transfer speed difference between the disk data rate and the host interface data rate. The memory buffer 422 may be a random access memory (RAM) chip, or, more specifically, a dynamic random access memory (DRAM) chip.

The interface controller 420 is also connected to the host computer 60 so as to transmit data to the host computer 60 upon request. Although the reading of data from a magnetic disk has been described, the process can be reversed in order to write data sectors to a magnetic disk.

Figure 2:
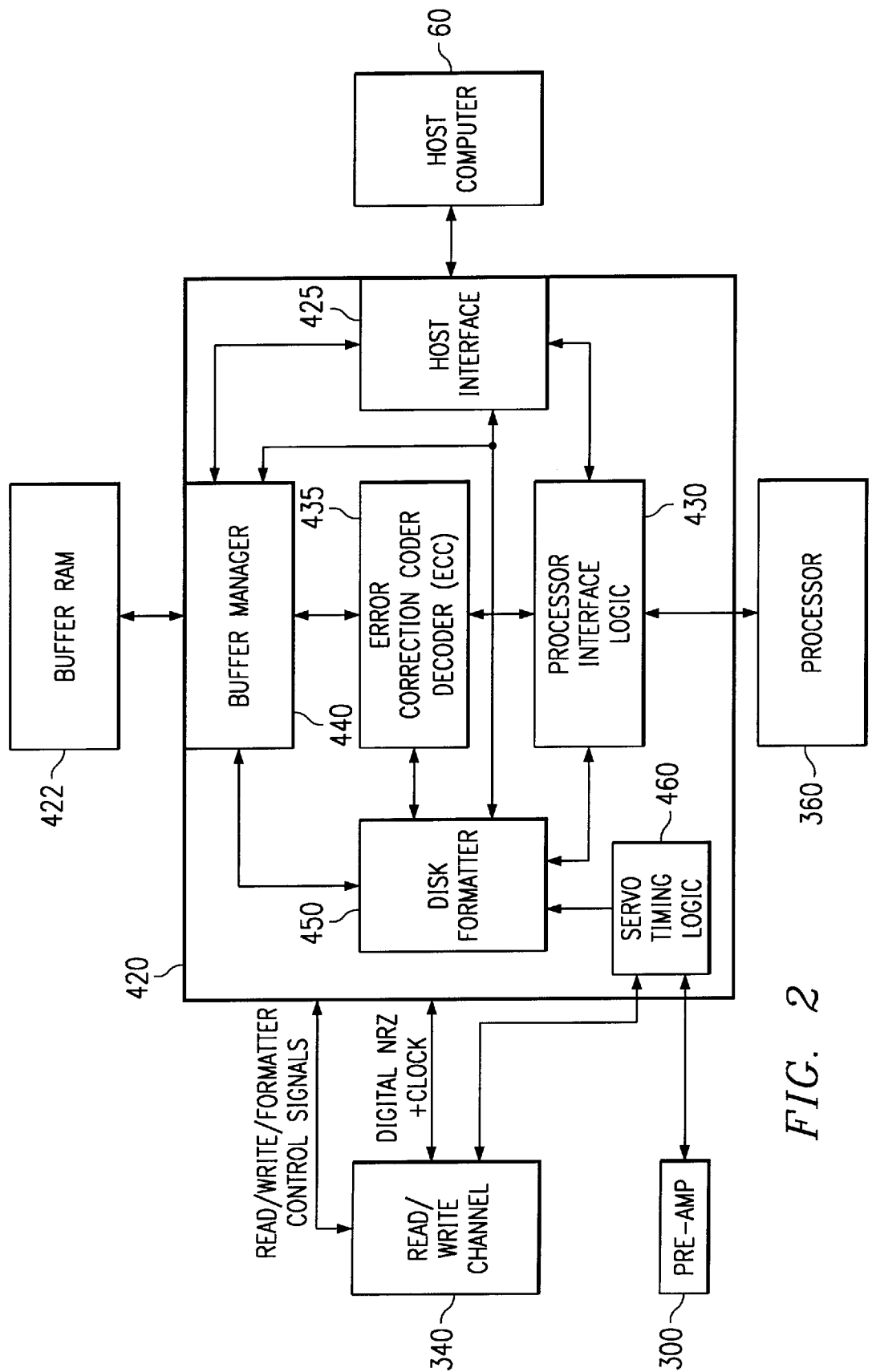
FIG. 2 shows the components of an interface controller which may be included within the hard disk drive system shown in FIG. 1.

FIG. 2 depicts an interface controller 420 of a type which may be included in the hard disk drive system 70 shown in FIG. 1. The interface controller 420 includes a host interface 425 which receives instructions and data sectors from the host computer 60. The host interface 425 also outputs data sectors to the host computer 60 in response to requests from the host computer 60.

The interface controller 420 includes a processor interface 430 by which the interface controller 420 interacts with the DSP 360. An error correction encoder/decoder (ECC) 435 is also included within the interface controller 420 which performs error detection and correction on data sectors read from the disk 260 and which generates error correction code when data is written to the disk 260. Data sectors are passed through the error correction encoder/decoder 435 under the control of a disk formatter 450 included within the interface controller 420. The buffer manager 440 arbitrates the requests from all of the other components of the interface controller 420 and controls the flow of data to and from the buffer memory 422.

The interface controller 420 also includes a disk formatter 450 which receives the digital data and clock output by the read/write channel 340 of FIG. 1. Significantly, the disk formatter 450 controls the formatting of data sectors and the reading and writing of data sectors to one of the magnetic disks 260 over which the pick-up head 280 is positioned in accordance with instructions received from the host computer 60 via the host interface 425. In addition, the disk formatter 450 also controls the operation of the error correction encoder/decoder (ECC) 435, with respect to the initiation and completion of the check bytes generation and detection process.

The servo timing logic 460 processes various servo fields in a servo wedge of the disk 260. In addition, the servo timing logic 460 includes a precision timing counter that counts from a sync field of the servo wedge to the next sync field which corresponds to the next servo wedge.

Figure 3:
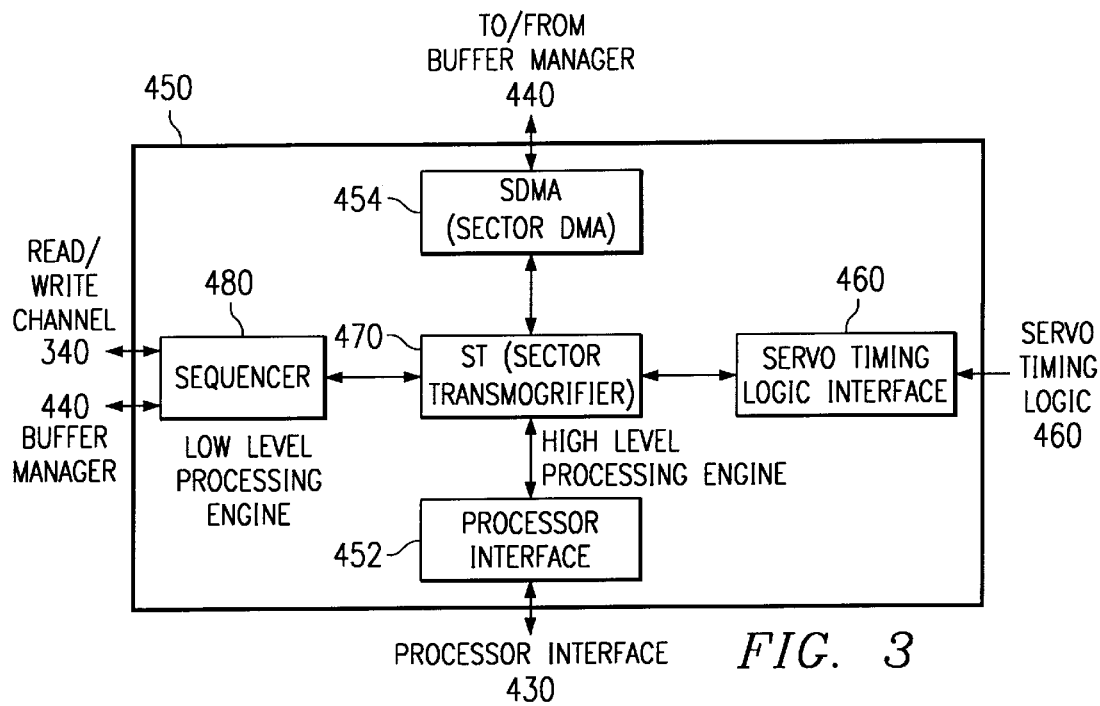
FIG. 3 shows a block diagram of a disk formatter.

FIG. 3 depicts the components of the disk formatter 450, which includes a DSP interface 452 and a sector direct memory access (SDMA) circuit 454. The DSP interface 452 provides an interface to the processor interface 430 to facilitate the transfer of data between the data formatter 450 and the DSP 360, whereas the SDMA circuit 454 provides an interface to the buffer manager 440 to facilitate the transfer of control data. The disk formatter 450 also includes a servo timing logic interface 475 which receives servo timing information from the servo timing logic 460. In particular, the servo timing logic interface 475 receives the output of the above-mentioned precision timing counter that counts from the sync field of the current servo wedge to the next sync field of the next servo wedge.

Significantly, the disk formatter 450 also includes a high level processing engine 470 and a low level processing engine 480, which is referred to as a Sector Transmogrifier and a Sequencer, respectively. A user programs the high level processing engine 470 with a set of instructions that includes at least two types of instructions. The first type includes instructions for moving data and performing arithmetic operations. The second type includes disk sequencing instructions for controlling disk operation.

Advantageously, the high level processing engine 470 can be programmed to accommodate different rotation positioning schemes which may correspond to an index pulse based wedge number identification system. Alternatively, the rotation positioning schemes may correspond to the unique binary sequence (UBS) based scheme, which identifies servo-wedge numbers while supporting an error tolerant capability. The unique binary sequence based scheme is described in detail in U.S. patent application No. 08/802,293, now U.S. Pat. No. 5,909,336, entitled "Position Detection Scheme for Headerless Disk Controller," which was filed on Feb. 18, 1997, by Schaffner et al., and which is incorporated herein by reference.

The use of the unique binary sequence may be further supplemented by the geometry per wedge (GPW) based formatting scheme, which defines the sector layout of each data wedge on a particular disk. The above-mentioned sequencer instructions, which are generated by the high level processing engine 470 "on the fly," are output to the low-level processing engine 480, as described more fully below.

The low level processing engine 480 executes the instructions provided by the high level processing engine 470 so as to implement the required disk operations. If the instructions relate to the reading of data from the disk or the writing of data thereto, then control signals are output from the low level processing engine 480 to the read/write channel 340 so that data can be transferred to or from the memory buffer 422 via a data path within the low level processing engine 480.

As noted above, the high level processing engine 470 generates instructions "on the fly" which are output to the low level processing engine 480. However, the time it takes to execute these instructions may be variable. The clock for the low level processing engine 480 is determined by the disk data transfer rate because low-level processing engine 480 controls the disk read/write operations.

In contrast, the high level processing engine 470 runs at a different clock speed which permits the processing of millions of instructions per second (MIPS). This ensures that the low level instructions output by the high level processing engine 480 are produced on time, and ensures that there is enough processing power to track the disk rotation position. In this regard, it is important to recognize that the high and low processing engines 470 and 480 run concurrently and semi-independently.

Given that the high level processing engine 470 must communicate with the low level processing engine 480, it is important to achieve the highest processing bandwidth possible. However, there are several constraints placed on communication between the two processing engines 470 and 480 in addition to the fact that they run at different clock speeds.

In particular, the low-level processing engine 480 must execute instructions one after another without any gap, because the disk is rotating constantly. Accordingly, the time required to synchronize the flow of data between the two processing engines 470 and 480 using hand-shaking techniques would yield delays which are unacceptable because the low level processing engine 480 cannot complete an instruction, send status information back to the high level processing engine 470 and then wait for another instruction from the same.

Moreover, the high level processing engine 470 must also track positional information, process tables and perform calculations, in addition to generating instructions for the low level processing engine 480. Therefore, the high level processing engine 470 cannot afford to spend time servicing status information received from the low-level processing engine 480.

In order to solve this problem, the present invention requires the use of an instruction queue in the low level processing engine. Advantageously, this instruction queue may be implemented as a first-in first-out (FIFO) random access memory (RAM) in the manner discussed below. The advantage provided by the instruction queue is that the need for synchronization between the high and low level processing engines 470 and 480 can be eliminated if the delivery of instructions to the low level processing engine is scheduled in accordance with the present invention.

Therefore, any delay due to synchronization is prevented. Preferably, a burst of instructions is sent from the high level processing engine 480 rather than just a single instruction at a time, the burst of instructions being a series of instructions output in rapid succession which saves the high level processing engine 480 bandwidth by eliminating the need for hand shaking for each instruction being stored in the instruction queue. In this way, the low level processing engine 480 will be able to process one instruction after another from the instruction queue. Moreover, the low-level processing engine 480 can sequentially process instructions for multiple sectors.

In order to discuss the implementation of the invention in greater detail, reference will be made to FIG. 4, which depicts the components of the disk formatter 450. The components of the disk formatter 450 are described in detail in the above-mentioned U.S. patent application entitled, "Programmable High Performance Disk Formatter for Headerless Disk Controller," which is being filed on Mar. 31, 1998, contemporaneously with the present application by Keats et al., and which is incorporated herein by reference. Accordingly, the present application addresses only a portion of the components of the disk formatter 450.

Figure 5:
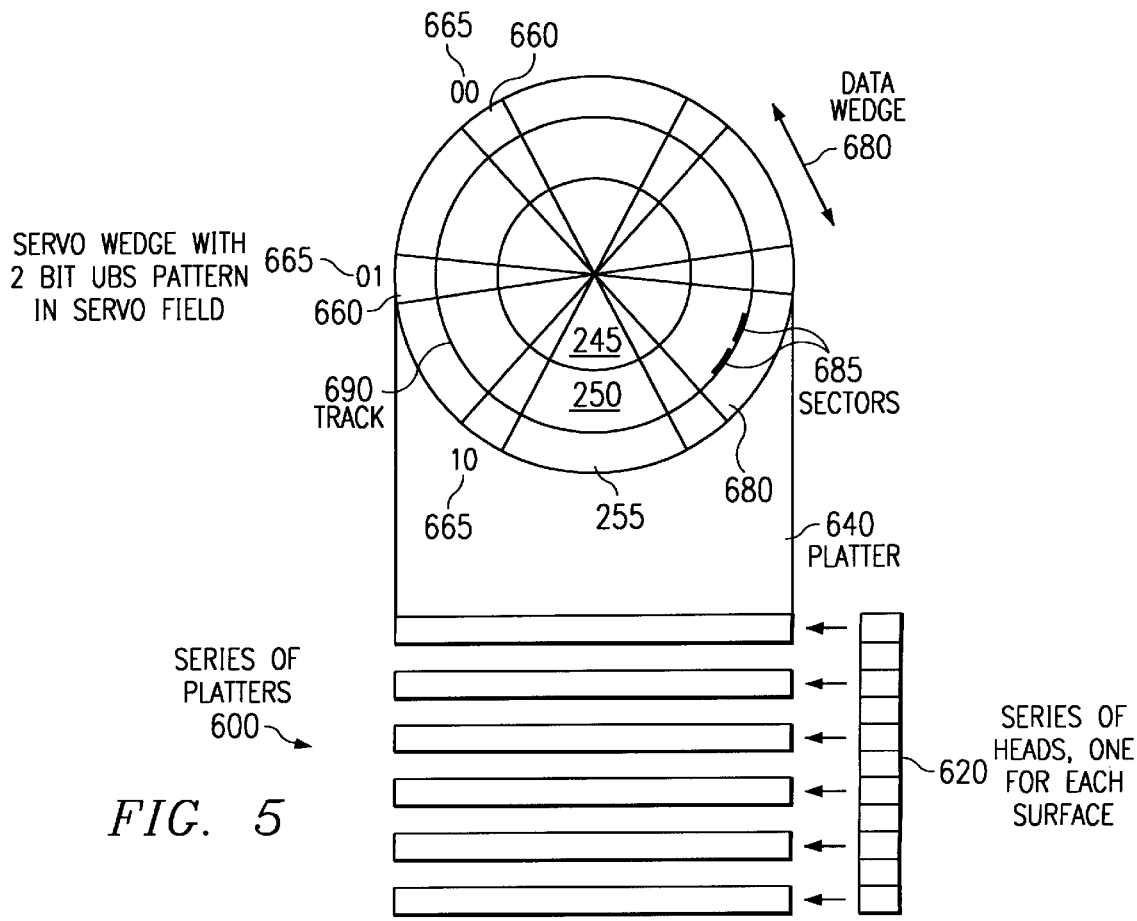
FIG. 5 shows a disk formatted in accordance with a wedge based disk formatting scheme.

Prior to discussing the components of the disk formatter 450, it is worthwhile to explore the features of a stack of disks 600 which could be subject to disk operations performed in accordance with the instructions generated by the high level processing engine 470, as shown in FIG. 5. The disks 600 (or platters) have corresponding heads 620 and are formatted in accordance with a wedge based formatting scheme.

As each of the disks 600 are formatted in the same manner, only a single disk 640 will be addressed. This disk 640 includes a number of servo wedges 660 and corresponding data wedges 680. The servo wedges 660 include data which identifies each wedge. By way of example, the data included in each servo wedge 660 may include a two-bit field 665, as shown in FIG. 5, which in one revolution of the disk forms a unique binary sequence (UBS) per platter surface. Alternatively, the data included in each servo wedge 660 may be a one bit index field, which assumes a value of one for a single servo wedge of the disk.

Each data wedge 680 includes sectors 685 which are disposed along at least one track 690. In addition, the servo and data wedges are segmented into zones 692, 694 and 696 which each have a constant number of sectors along the tracks extending through those wedges. However, this constant number of sectors could be different for different zones 692, 694 and 696.

In this regard, the wedge based formatting scheme may utilize geometry per wedge (GPW) based sector layout information describing the sector layout within a particular zone 692, 694 and 696 of a data wedge 680 which is uniquely defined by the entry of a GPW table.

Referring to FIG. 5, there are six GPW entries per zone, with three zones. Accordingly, there are eighteen entries within a particular GPW table. Each GPW entry includes multiple fields, which define, for example, the first sector number in a data wedge, the number of sector pulses, and specific sector pulse timing information.

Figure 4A:
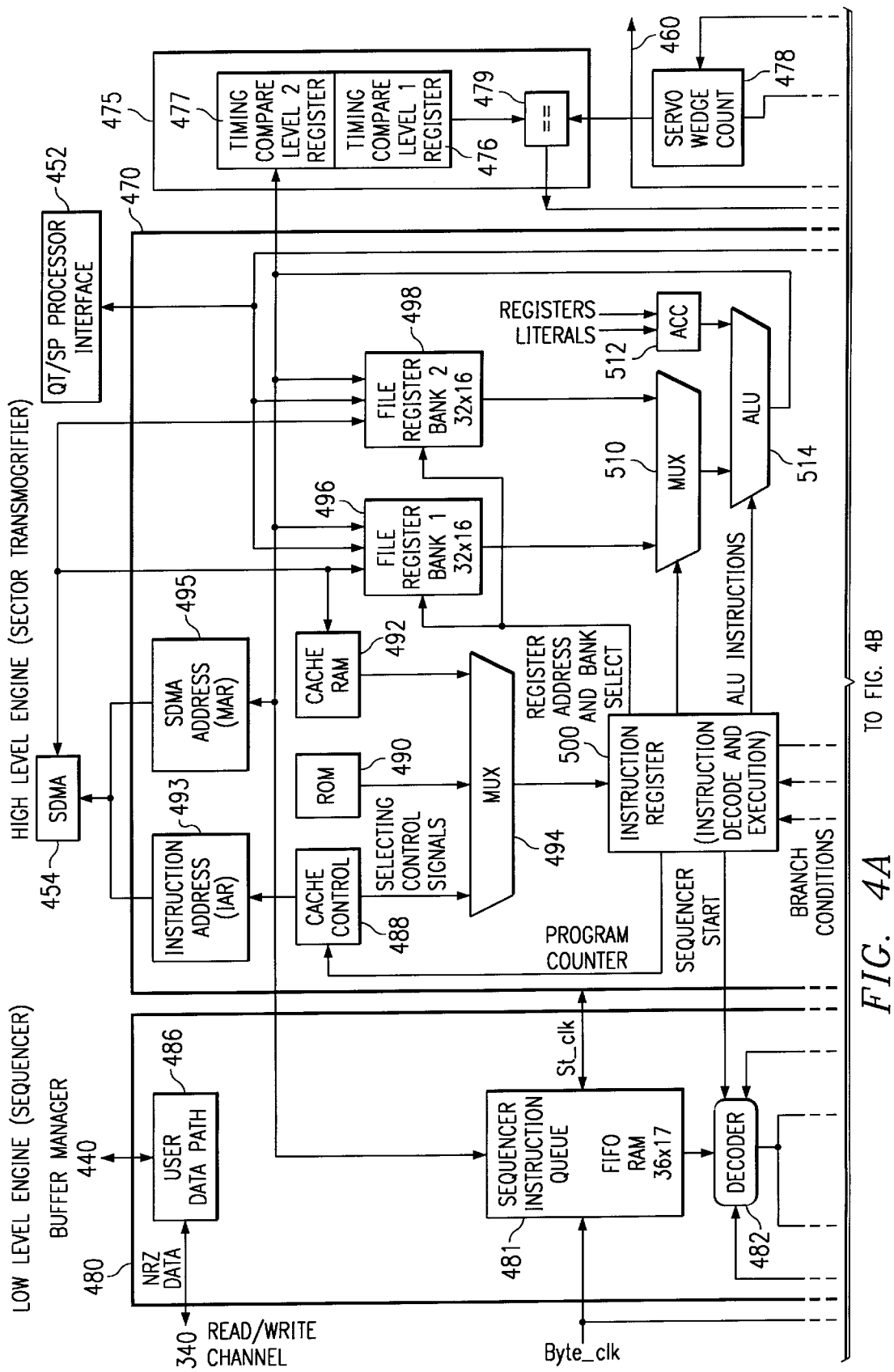
FIG. 4 shows a block diagram of the low-level processing engine and the high level processing engine.
Figure 4B:
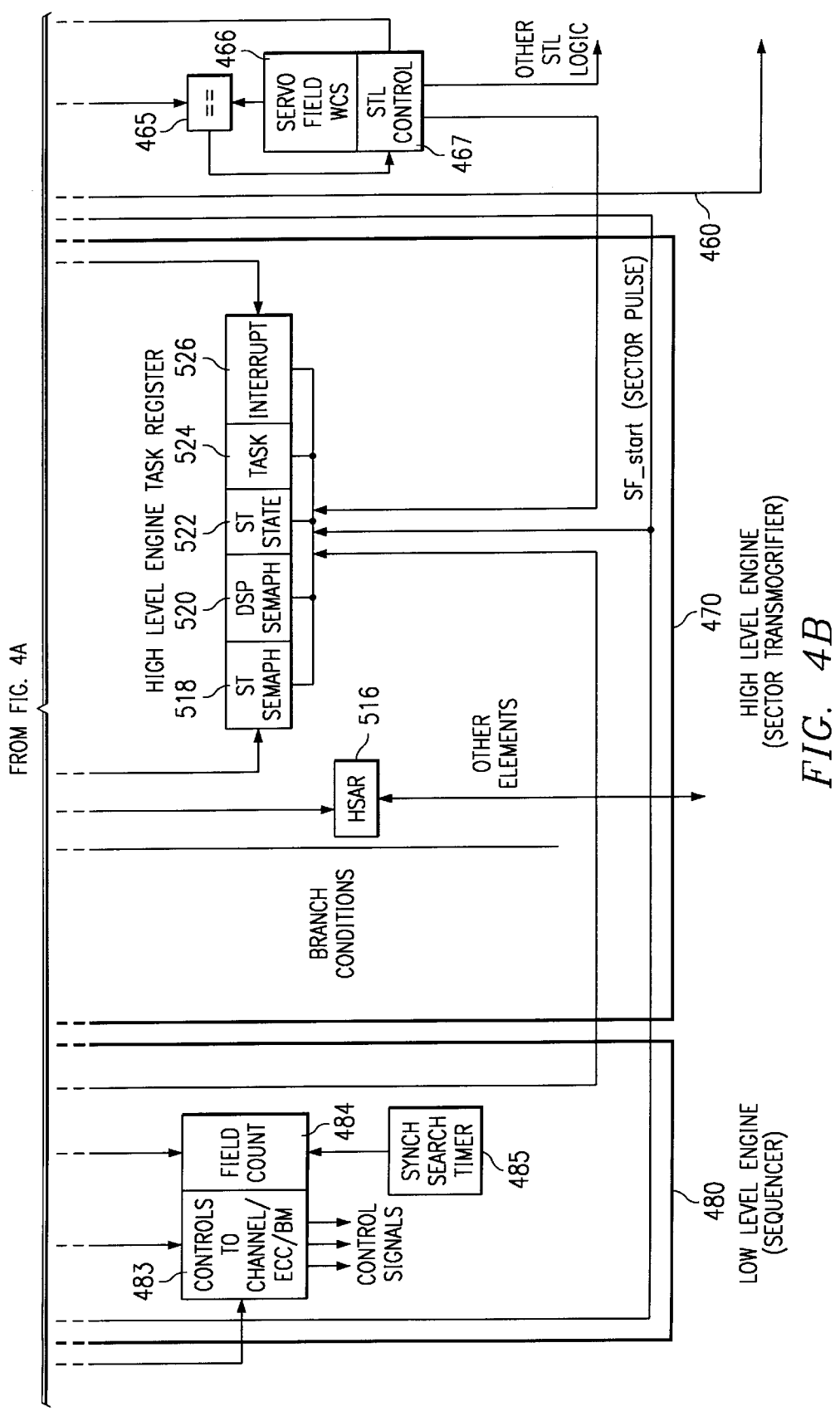

As shown in FIG. 4, the high level processing engine 470 includes an instruction execution unit 500 which receives instructions via a multiplexer 494 from an instruction cache 492, which may be implemented as embedded RAM, and an embedded read only memory (ROM) 490, which stores time critical routines. A hardware status and action register 516 is also included within the high level processing engine 470 which provides a two way communications channel between the high level processing engine 470 and other elements of the interface controller 420.

The above-mentioned instruction cache 492 receives instructions from the buffer memory 422 via the SDMA 454. To facilitate the receipt of an instruction from the buffer memory 422, an instruction address register (IAR) 493 is provided which contains the address of the instruction which is to be stored in the instruction cache 492. The instruction execution unit 500 will also access the buffer memory 422 to retrieve control information (i.e. rotation positioning information, such as unique binary sequence data, or sector layout information, such as GPW tables) via the SDMA 454. To facilitate the retrieval of control information from the buffer memory 422 via the SDMA 454, an SDMA address register (MAR) 495 is provided that contains the buffer address of the control information to be stored in one of the file registers 496 or 498.

The output of the multiplexer 494 is controlled by a selection signal received from a cache control 488. The instruction execution unit 500 decodes machine level instructions to execute a number of tasks such as moving data into file registers 496 and 498, or modifying file register and accumulator data via the arithmetic logic unit (ALU) 514. Significantly, an additional task would include generating low level instructions which are output to the low level processing engine 480. Each of these tasks are carried out in response to a request from the host computer 60 via the host interface 425 to perform a specific disk operation on a predetermined sector or sectors, such as the transfer of data to or from a particular disk.

In order to read or write data to a predetermined sector of a particular disk, the high level processing engine 470 must precisely coordinate the generation and transfer of low-level commands to the low level processing engine 480. This coordination is aided by the generation of sector pulses which signify the beginning of corresponding sectors. Sector pulses are generated in accordance with sector timing compare values calculated by a high-level engine program whose instructions are executed by the instruction execution unit 500. The manner in which sector timing compare values are used to generate sector pulses is described below.

Based on the zone number and wedge number, the high level processing engine 470 calculates a corresponding address of a GPW table in the buffer memory 422. The GPW table includes a number of GPW entries which can be fetched into the file registers 496 or 498 using high level memory access instructions.

In addition to the current wedge number, file registers 496 or 498 also store a sector timing compare value which is updated upon generation of each sector pulse within the current wedge or under the control of the above-mentioned high level processing engine program.

Assuming that the predetermined sector is the first sector within a particular wedge then the burst of instructions for that sector will be transmitted at least one sector prior to the arrival of the predetermined sector at the signal pick-up head 280, the burst of instructions being transmitted after the occurrence of a sector pulse which is generated in the manner described below. However, before the sector pulse can be generated for the sector preceding the predetermined sector, it must be scheduled in accordance with the present invention through the use of a sector timing compare value which represents the displacement in time of the start of a sector from the start of the wedge in which the sector is included. Because the predetermined sector is the first sector of a wedge, the sector preceding the predetermined sector falls within the wedge preceding the wedge in which the predetermined sector is located.

In contrast, if the predetermined sector is at least the second sector within the wedge then the burst of instructions for that sector would be generated in the wedge in which the predetermined sector is located.

The sector timing compare value generated by the high level processing engine 470 is received by a servo timing logic interface 475 which is also included within the high level processing engine 470. However, this component of the high level processing engine 470 has been included in a separate functional block to better illustrate the operation of the disk formatter 450.

According to the present invention, the sector timing compare value for the current sector being searched for (i.e. the above-mentioned preceding sector pulse) is stored in the register 476 (referred to as a level one register) prior to the time the start of that sector passes by the signal pick-up head 280. Preferably the sector timing compare value would be generated by the high level processing engine 470 and stored in register 477 (referred to as a level two register) two sectors before the start of the sector passes by the signal pick-up head 280. Both the level one and level two registers 476 and 477 are included in the servo timing logic interface 475.

The sector timing compare value for the current sector being searched for is compared with the output of a servo wedge counter 478 in the servo timing logic 460 by a comparator 479 in the servo timing logic interface 475. The servo wedge counter 478 counts the time elapsed precisely from one servo synchronization field of a current servo wedge to the next servo synchronization field of the next servo wedge.

When the comparator 479 determines that the output of the servo wedge count 478 equals the sector timing compare value for the current sector being searched for, a sector pulse is generated by the comparator 463. Thereafter, the value stored in the level two register 477 is transferred to the level one register 476, and so becomes the sector timing compare value for the current sector being searched for in anticipation of generating the next sector pulse. The high level processing engine 470 then calculates and stores a sector timing compare value for the next sector to be searched for in the register 477.

As for the remaining components of the servo timing logic 460, they include a servo field WCS 466 that provides compare values to detect data in the servo field of the servo wedge. By way of example, the data may include unique binary sequence data bits. The servo timing logic 460 also includes a servo timing logic control unit 467 that provides control status signals to the task register 518, 520, 522, 524, 526, as well as other servo timing logic components (not shown) based on data within the servo field. These control signals may include unique binary sequence data and strobe signals which are generated when the unique binary sequence data is detected.

In addition, the servo timing logic 460 includes a comparator 465 for comparing the servo field compare values from the servo field WCS 466 to the value stored in the servo wedge counter 478. The servo wedge counter 478 is reset periodically upon detection of the servo synchronization field within each new servo wedge.

Figure 6:
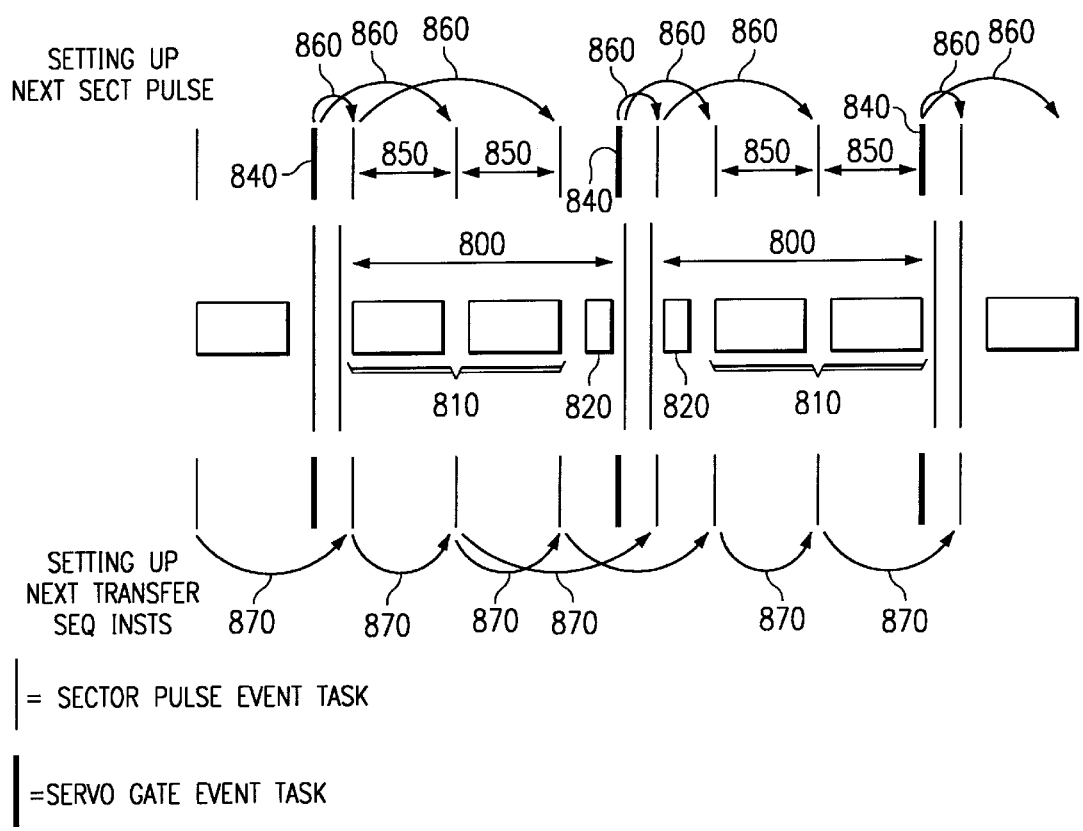
FIG. 6 is a timing diagram for multiple consecutive data wedges of a magnetic disk formatted using the geometry per wedge (GPW) based disk formatting scheme which illustrates an aspect of the present invention.

An example of the scheduling of the above-mentioned sector timing compare values and instructions has been provided above. However, FIG. 6 shows a timing diagram which illustrates the scheduling concept more generally. In particular, two complete wedges 800 are shown. Each wedge includes two complete sectors 810 and at least one fragment 820 of a sector. Servo wedge pulses 840 (i.e. servo gate events) which indicate the start of a wedge are followed by sector pulses 850 (i.e. servo pulse events) which indicate the start of a sector or fragment thereof.

Above and below each wedge in the figure are a series of curved arrows 860 and 870, which illustrate the scheduling of sector timing compare values and low level instruction generation, respectively. Each sector pulse 850 is preferably preceded by the generation of a sector timing compare value at least two sector pulses 850 prior to the occurrence of that sector pulse 850, with the exception of the first two sector pulses following a servo wedge whose timing values are generated at a servo wedge pulse 840, as shown by the arrows 860.

In contrast to the scheduling of sector pulses, the scheduling of a burst of instructions occurs one sector pulse 850 prior to the occurrence of the sector pulse 840 for a predetermined sector which is to be subject to a particular disk operation, as shown by the arrows 870. This is the case even if the sector pulse for the preceding sector falls in the wedge preceding the wedge in which the predetermined sector is located. In the case of a pair of sector fragments 820, the burst of instructions for both sector fragments 820 must occur one segment prior to the occurrence of the sector pulse for the first fragment 820, as shown by the arrows 870 directed to those fragments 820.

Once a sector pulse has been generated it is output to a task register 518, 520, 522, 524 and 526. Based on the value of the bits stored in the task register 518, 520, 522, 524 and 526, the high level processing engine 470 will then carry out specific tasks using various user-specified subroutines. These tasks may include outputting another sector timing compare value to the level two register 477, or sending a burst of instructions to the lower level processing engine 480 so that a predetermined sector is subject to a particular disk operation if the sector pulse task bit in the task register 518, 520, 522, 524, and 526 indicates that a sector pulse has been generated. In this regard, it is the high level processing engine 470 program which detects the sector pulse task bit.

The instructions output by the high level processing engine 470 are received by the low level processing engine 480 and stored in the instruction queue 481, which also receives as input the clock (ST_CLK) from the high level processing engine 470 and another clock signal (BYTE_CLK) which corresponds to a particular disk transfer rate. The decoder 482 receives a sequencer start signal (SEQ_START), which is generated as a result of executing a sequence start instruction by the high level processing engine 470. The sequence start signal indicates that the low level processing engine 480 can begin the execution of one or more instructions associated with, for example, a request by the host computer 60 to read or write one or more sectors of data. The decoder 482 also receives sector pulses output by the comparator 479 which trigger the execution of low level instructions (which require the detection of sector pulses) output by the instruction queue 481.

Preferably, the instruction queue 481 can be a 36X17 FIFO RAM. In this case, the size of the buffer memory 481 is a function of the word length of each low level instruction (17 bits) and the fact that one sector of low level instructions for various types of sector formats may require space for up to twelve words. Accordingly, a queue of thirty-six words can accommodate instructions for a sector plus two fragments of a sector.

One twelve-word segment of the thirty-six word queue is employed for the instructions being processed for a particular sector, whereas the remaining two twelve-word segments of the thirty-six word queue are employed for the instructions which will be stored for a sector following that sector. The reason for two additional twelve-word segments stems from the fact that a single sector could be parsed into two fragments which reside in separate wedges of a particular disk.

Each of the fragments requires its own group of instructions. Thus, with respect to the allocation of space within the instruction queue 481, the fragments are treated as separate sectors whose total data field length equals the length of a full sector of data. Therefore, in the case in which sector fragments are included within the wedges of a particular disk, the instruction queue 481 should include space for at least three separate sectors worth of instructions. However, in the case in which sector fragments are not employed, space need only be provided within the instruction queue 481 for two sectors worth of instructions.

When a sequence start signal, which is generated upon the execution of the sequencer start instruction by the high level engine 470, is received by the decoder 482, it outputs a queued instruction to the decoder 482 which decodes the instruction and outputs the result to a register 483. The register 483 outputs control signals to the read/write channel 340 and the buffer manager 440 when a read or write task must be completed for a predetermined sector.

In addition, the register 483 will output control signals to the error correction encoder/decoder (ECC) 435 if error correction is required for a specific sector of data. The register 484 includes a value which represents the time that a particular control signal will be asserted, while the timer 485 acts as an interrupt to the register 484, when a predetermined period of time has lapsed and a synchronization pattern has not been detected in the NRZ data received from the read/write channel 340 during a read disk operation.

Following the receipt of a sequencer stop instruction from the high level processing engine 470 and the subsequent execution of that instruction by the decoder 482 of the low level processing engine 480, the decoder 482 will output status information to the task register 518, 520, 522, 524, and 526 indicating that a particular sequence of instructions corresponding to at least one sector has been completed. The sequencer stop instruction is usually the last instruction associated with the execution of a particular disk operation.

The low-level processing engine 480 also includes a data path 486 so that user data can be output or received from the data formatter 480 to either the read/write channel 340 or the buffer manager 440.

Figure 7:
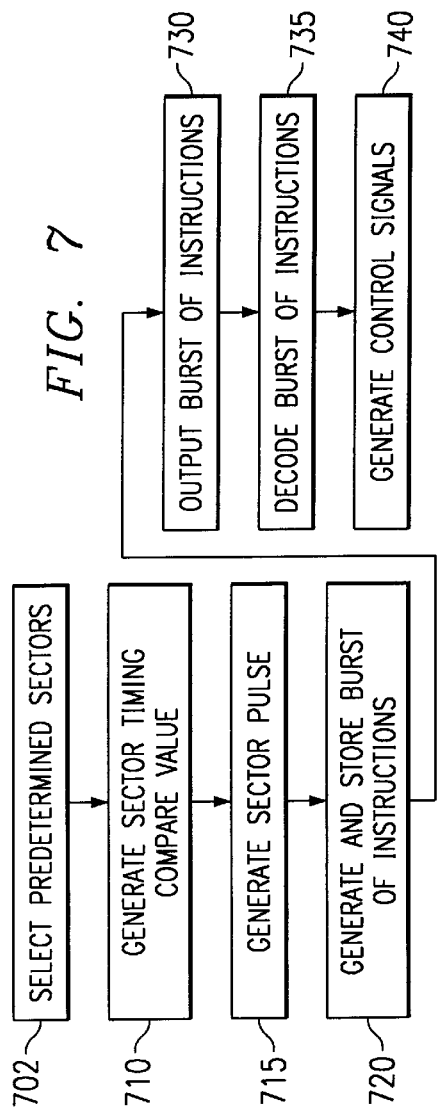
FIG. 7 is a flow chart depicting the steps of a method of the present invention which may be implemented in software.

The present invention also embodies a method for providing for efficient communication between high and low level processing engines of a disk formatter for formatting a disk which stores data. Turning to FIG. 7 which depicts a flow chart diagram for the inventive method, in step 702 a predetermined sector of a disk having tracks disposed thereon is selected for being subject to a particular disk operation, the disk being formatted in accordance with a wedge based formatting scheme of the type illustrated in FIG. 5.

In step 710, sector timing compare values are generated by the high level processing engine which correspond to the locations of the predetermined sector and those sectors within the wedge which precede the predetermined sector. These sector timing compare values are measured in terms of the time from the beginning of the servo wedge synchronization field to the start of a sector.

The timing associated with the generation of these sector timing compare values is important, insofar as the values are used to generate sector pulses in step 715 which indicate the start of a particular sector. These sector pulses are each used to trigger the generation of a burst of low-level instructions which is output by the high level processing engine 470 (shown in FIG. 4) and stored in an instruction queue 481 (shown in FIG. 4) of the low level processing engine in steps 720 in accordance with a clock signal of the high-level processing engine 470. As noted above in connection with FIG. 6, the sector timing compare values are generated repeatedly for each succeeding sector pulse.

Significantly, the burst of instructions used to implement a particular disk operation for a predefined sector must be generated at least one sector prior to the arrival of the beginning of the predetermined sector at the signal pick-up head 280. To ensure that the burst of instructions is output at the appropriate time (i.e. contemporaneously with the generation of the sector pulse which corresponds to the sector preceding the predetermined sector), the sector timing compare value for the sector preceding the predetermined sector must be generated prior to the time the sector pulse for the preceding sector is to be generated. This is because the sector timing compare value must be compared with the output of a counter (i.e. the servo wedge counter 478) prior to the generation of the sector pulse, as noted above in connection with the discussion of FIG. 4.

Preferably, the sector timing compare value for the sector preceding the predetermined sector will be calculated by the high level processing engine 470 two sectors prior to the time the sector pulse for the preceding sector is to be generated, with one exception. When the timing compare values for the first two sector pulses are generated, they will be generated at the servo gate event rather than the sector pulse event. The reason for this stems from the fact that a small fragment may follow the servo wedge so closely that there is insufficient time for the sector timing compare value calculation to be completed.

In step 730, the burst of instructions is output one at a time from the memory buffer 481 and is decoded in step 735. Thereafter, control signals are generated in step 740 which correspond to a particular disk operation.

It will be apparent to those skilled in the art that various modifications and variations can be made to the apparatus and method of the present invention without departing from the spirit or scope of the invention. Thus, it is intended that the present invention cover the modifications and variations of this invention provided they come within the scope of the appended claims and their equivalents.

What is claimed is:

1. An apparatus for providing for efficient communication between high level and low level processing engines in a disk formatter for formatting a disk which stores data, said high-level processing engine outputting at least one instruction for controlling disk operations to said low-level processing engine which processes said instruction, said apparatus comprising:
   an instruction queue included within said low-level engine in said disk formatter, said instruction queue storing said instruction received by said low level processing engine from said high level processing engine in said disk formatter, said high level processing engine in said disk formatter outputting said instruction to said instruction queue in accordance with a first clock signal generated by said high-level engine in said disk formatter, said instruction queue outputting said instruction in accordance with a second clock signal of said low level processing engine which corresponds to a predetermined disk transfer rate.

2. The apparatus defined in claim 1, wherein said instruction queue stores a burst of instructions received by said low level processing engine from said high level processing engine, said burst of instructions corresponding to a predetermined sector of said disk.

3. The apparatus defined in claim 2, wherein said disk is formatted in accordance with sector layout information.

4. The apparatus defined in claim 3, wherein said sector layout information is defined by a geometry per wedge (GPW) based formatting scheme, and wherein one of a predetermined sector and a fragment of said predetermined sector is included within a data wedge of said disk.

5. The apparatus defined in claim 4, wherein said burst of instructions is output by said high level processing engine at least one sector before said predetermined sector to which said instructions correspond is subjected to a disk operation.

6. The apparatus defined in claim 4, wherein said predetermined sector on said disk comprises two separate fragments, each included within a separate data wedge of said disk, said burst of instructions corresponding to said two separate fragments of said predetermined sector and being output at least one sector before a first fragment of said predetermined sector is subjected to a disk operation.

7. The apparatus defined in claim 5, wherein for each sector within said data wedge corresponding to any one of said predetermined sector and sectors preceding said predetermined sector, a sector pulse is generated by said high level processing engine, said burst of instructions being output by said high level processing engine upon generation of said sector pulse which corresponds to one of said sectors preceding said predetermined sector.

8. The apparatus defined in claim 7, wherein said sector pulse corresponding to said predetermined sector is generated by said high level processing engine based upon a sector timing compare value which reflects a relative position of a sector within a data wedge.

9. The apparatus defined in claim 1, wherein said instruction queue outputs the instruction to a decoder included within said low level processing engine, said decoder receiving and processing said instruction in accordance with said second clock signal when said high level processing engine executes a start signal.

10. The apparatus defined in claim 1, wherein said first clock signal and said second clock signal have different frequencies.

11. A method for providing for efficient communication between high and low level processing engines in a disk formatter for formatting a disk which stores data, said method comprising the steps of:
    storing an instruction for controlling disk operations output by said high level processing engine in said disk formatter in an instruction queue of said low level processing engine in said disk formatter, said instruction being output by said high level processing engine in said disk formatter in accordance with a first clock signal generated by said high level processing engine in said disk formatter; and
    outputting said instruction from said instruction queue in accordance with a second clock signal of said low level processing engine which corresponds to a predetermined disk transfer rate.

12. The method defined in claim 11, wherein said step of storing comprises the step of storing a burst of instructions output by said high level processing engine, said burst of instructions corresponding to a predetermined sector of said disk.

13. The method defined in claim 12, further comprising the step of formatting said disk in accordance with sector layout information.

14. The method defined in claim 13, wherein said sector layout information is defined by a geometry per wedge (GPW) based formatting scheme, and wherein said method further comprises the step of including one of a predetermined sector and a fragment of said predetermined sector within a data wedge of said disk.

15. The method defined in claim 14, further comprising the step of outputting said burst of instructions from said high level processing engine at least one sector before said predetermined sector to which said burst of instructions corresponds is subjected to a disk operation.

16. The method defined in claim 14, wherein said predetermined sector of said disk comprises two separate fragments, wherein said step of including comprises the step of including each of said two fragments within a separate data wedge of said disk, said burst of instructions corresponding to said two separate fragments of said predetermined sector, and wherein said step of outputting said burst of instructions occurs at least one sector before a first fragment of said predetermined sector is subjected to a disk operation.

17. The method defined in claim 15, further comprising the step of generating a sector pulse from said high level processing engine for a sector within said data wedge corresponding to any one of said predetermined sector of data and sectors preceding said predetermined sector, said step of outputting said burst of instructions occurring upon generation of said sector pulse which corresponds to one of the sectors preceding the predetermined sector.

18. The method defined in claim 15, further comprising the step of performing said step of generating said sector pulse corresponding to said predetermined sector based upon a sector timing compare value which reflects a relative position of a sector within a data wedge.

19. The method defined in claim 11, further comprising the step of decoding the instruction output by said instruction queue in accordance with said second clock signal when the high level processing engine executes a start instruction.

20. The apparatus defined in claim 11, wherein said first clock signal and said second clock signal have different frequencies.

* * * * *